(12) United States Patent
Saijo et al.

(10) Patent No.: US 7,033,641 B2
(45) Date of Patent: Apr. 25, 2006

(54) GAS SEPARATING UNIT AND METHOD FOR MANUFACTURING THE SAME

(75) Inventors: Kinji Saijo, Yamaguchi-ken (JP); Shinji Ohsawa, Yamaguchi-ken (JP); Hiroaki Okamoto, Yamaguchi-ken (JP); Kazuo Yoshida, Yamaguchi-ken (JP); Tsutomu Seki, Tokyo (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 10/490,946

(22) PCT Filed: Sep. 26, 2001

(86) PCT No.: PCT/JP01/08353

§ 371 (c)(1),
(2), (4) Date: Mar. 26, 2004

(87) PCT Pub. No.: WO03/031037

PCT Pub. Date: Apr. 17, 2003

(65) Prior Publication Data

US 2005/0076779 A1    Apr. 14, 2005

(51) Int. Cl.
*B01D 70/02* (2006.01)
*B01D 53/22* (2006.01)

(52) U.S. Cl. .............. 427/250; 95/56; 96/11; 55/524; 55/DIG. 5

(58) Field of Classification Search .......... 95/56, 95/55; 96/4, 11, 8, 10; 55/524, DIG. 5; 427/250, 282
See application file for complete search history.

(56) References Cited

U.S. PATENT DOCUMENTS

| | | | |
|---|---|---|---|
| 2,824,620 A * | 2/1958 | De Rosset | 95/96 |
| 3,238,703 A * | 3/1966 | Straschil et al. | 96/4 |
| 3,238,704 A * | 3/1966 | Straschil et al. | 96/11 |
| 3,336,730 A * | 8/1967 | McBride et al. | 95/56 |
| 3,469,372 A * | 9/1969 | Yamauchi et al. | 96/11 |
| 3,767,538 A * | 10/1973 | Politycki et al. | 205/167 |
| 4,869,930 A * | 9/1989 | Clarke et al. | 427/96.8 |
| 5,393,325 A | 2/1995 | Edlund | |
| 5,782,960 A | 7/1998 | Ogawa et al. | |
| 5,916,401 A * | 6/1999 | Gannon | 156/240 |
| 6,183,542 B1 * | 2/2001 | Bossard | 96/11 |
| 6,319,306 B1 * | 11/2001 | Edlund et al. | 96/7 |

(Continued)

FOREIGN PATENT DOCUMENTS

EP    796647    9/1997

(Continued)

OTHER PUBLICATIONS

Akira Kobuchi et al, "Hydrogen Separation Membrane and Its Production", JAPIO abstract of JP 7124453, 1995.

(Continued)

*Primary Examiner*—Robert H. Spitzer
(74) *Attorney, Agent, or Firm*—Browdy and Neimark, PLLC (57) ABSTRACT

A method for manufacturing a gas separating unit which comprises laminating a metal plate on a material capable of separating a hydrogen gas (palladium alloy foil) by cladding, etching selectively a central portion of a cut clad plate (K) using an etching solution, to thereby expose an underlying palladium alloy foil layer, and providing a metal supporting plate on the other side of the palladium alloy foil layer. The method allows the manufacture of a gas separating unit having an enhanced effective area of a material capable of separating a hydrogen gas and is excellent in the handlability of a material capable of separating a hydrogen gas during manufacturing.

9 Claims, 5 Drawing Sheets

U.S. PATENT DOCUMENTS

| | | | |
|---|---|---|---|
| 6,332,913 B1* | 12/2001 | Breitschwerdt et al. | 95/55 |
| 6,419,726 B1* | 7/2002 | Frost et al. | 95/56 |
| 6,582,499 B1* | 6/2003 | Frost et al. | 96/7 |
| 6,602,325 B1* | 8/2003 | Frost et al. | 95/56 |
| 6,660,069 B1* | 12/2003 | Sato et al. | 96/4 |
| 6,666,909 B1* | 12/2003 | TeGrotenhuis et al. | 95/273 |
| 6,761,755 B1* | 7/2004 | Jantsch et al. | 96/11 |
| 6,776,918 B1* | 8/2004 | Yoshikawa et al. | 216/96 |
| 2002/0011152 A1* | 1/2002 | Oku et al. | 96/4 |
| 2002/0078827 A1* | 6/2002 | Thornton | 96/11 |
| 2002/0124723 A1* | 9/2002 | Frost et al. | 95/56 |
| 2004/0003720 A1* | 1/2004 | Beisswenger et al. | 96/11 |

FOREIGN PATENT DOCUMENTS

JP          1-153344          10/1989

OTHER PUBLICATIONS

Yoshinori USHIFUSA et al, "Hydrogen Gas Separation Membrane", JAPIO abstract of JP5076738, 1993.

Yukitaka Hamada et al, "Pressure-Resistant Hydrogen Permeable Membrane and Its Prodution", JAPIO abstract of JP2000296316, 2000.

* cited by examiner

Separating gas

Fig. 5

GAS SEPARATING UNIT AND METHOD FOR MANUFACTURING THE SAME

TECHNICAL FIELD

The present invention relates to a gas separating unit that separates a particular gas (for instance, hydrogen gas) in a mixed gas and a method for manufacturing the same.

BACKGROUND ART

So far, as a method of refining and recovering a hydrogen gas from a hydrogen-containing gas, there are methods such as a method in which impurities are separated and removed by use of a pressure swing absorption method (PSA method) that makes use of an absorbing agent and a method for separating hydrogen by use of an organic or inorganic hydrogen separating membrane. The method that uses a hydrogen separating membrane is gathering attention in view of energy saving, separation efficiency, simplicity of apparatus configuration, easiness in operation and so on.

As the hydrogen separating membrane, membranes of organic polymers such as polyimide, polysulfone and so on; porous membranes of inorganic materials such as porous glass, porous ceramics and so on; and membranes of palladium or palladium alloys can be cited. For instance, in JP-A-07-124453, steps of forming a hydrogen separating membrane are described, in which on one surface of a metal support thin films of palladium and other metal, respectively, are alternately deposited by means of electroplating, on one surface of the metal support a lot of fine holes are bored by means of etching, heat treatment is applied to form a palladium alloy, furthermore a surface of a metal plate is etched to form a lot of fine holes, and these are integrated to form a hydrogen separating membrane.

However, there are problems in that it is difficult to form a plating layer excellent in the adherence directly on a metal support plate such as a stainless steel sheet and so on as mentioned above; and an alloy layer of palladium and nickel in the lastly applied heat treatment step may not be stably formed with a definite thickness.

Furthermore, there is another problem in that since in the plating, defects such as pinholes and so on are likely to occur, thin films of metal such as palladium and so on are formed with pores. In particular, in the case of multi-layered plating being applied, since the conditions such as a plating bath composition, an electric current, a temperature and so on have to be strictly controlled; that is, it becomes a very cumbersome process.

Still furthermore, there is still another problem in that since an exposed area of a thin film of metal such as palladium and so on cannot be made larger, there is a limit in an amount of permeable gas.

An object of the present invention is to provide a gas separating unit in which, in separating hydrogen gas, an effective area of a material capable of separating a hydrogen gas can be made larger and a method for manufacturing the same.

Furthermore, another object of the invention is to provide a method for manufacturing a gas separating unit that takes the handlability of a material capable of separating a hydrogen gas into consideration.

Still furthermore, still another object of the invention is to provide a gas separating unit that can increase an exposed area of a material capable of separating a hydrogen gas and can increase an amount of permeable hydrogen gas.

DISCLOSURE OF INVENTION

A gas separating unit according to the present invention is characterized in that a material capable of separating a hydrogen gas has an extension frame that extends the foil laminated on one surface thereof and a metal support body that supports the foil and has a lot of holes laminated on the other surface thereof.

Furthermore, a gas separating unit according to the invention is characterized in that a laminated plate is formed by laminating a material capable of separating a gas on one surface of a metal plate, after an obtained laminated plate is made thinner in its thickness, the metal plate of the laminated plate is etched to expose the material capable of separating a gas and an extending frame is formed.

In these gas separating units, the material capable of separating a hydrogen gas or the material capable of separating a gas is preferable to be a palladium foil or a palladium alloy foil.

A method of manufacturing a gas separating unit according to the invention is characterized in that on one surface of a metal plate a material capable of separating a hydrogen gas is laminated by a cladding process to manufacture a clad plate; an obtained clad plate is cut into a cut clad plate; the metal plate of the cut clad plate is etched to expose the material capable of separating a hydrogen gas and an extending frame is formed, and on the other surface of the material a metal support that supports the material is laminated.

Furthermore, a method of manufacturing a gas separating unit according to the invention is characterized in that on one surface of a metal plate a material capable of separating a gas is laminated to form a laminated plate; and, after an obtained laminated plate is made thinner in its thickness, the metal plate of the laminated plate is etched to expose the material capable of separating a gas and an extending frame is formed.

BRIEF DESCRIPTION OF THE DRAWINGS

FIGS. 3(*a*) through 3(*c*) are diagrams for explaining the etching of a cut clad plate K.

BEST MODE FOR CARRYING OUT THE INVENTION

In what follows, a hydrogen gas separating unit according to the present invention will be explained with reference to the drawings.

Figure 1:
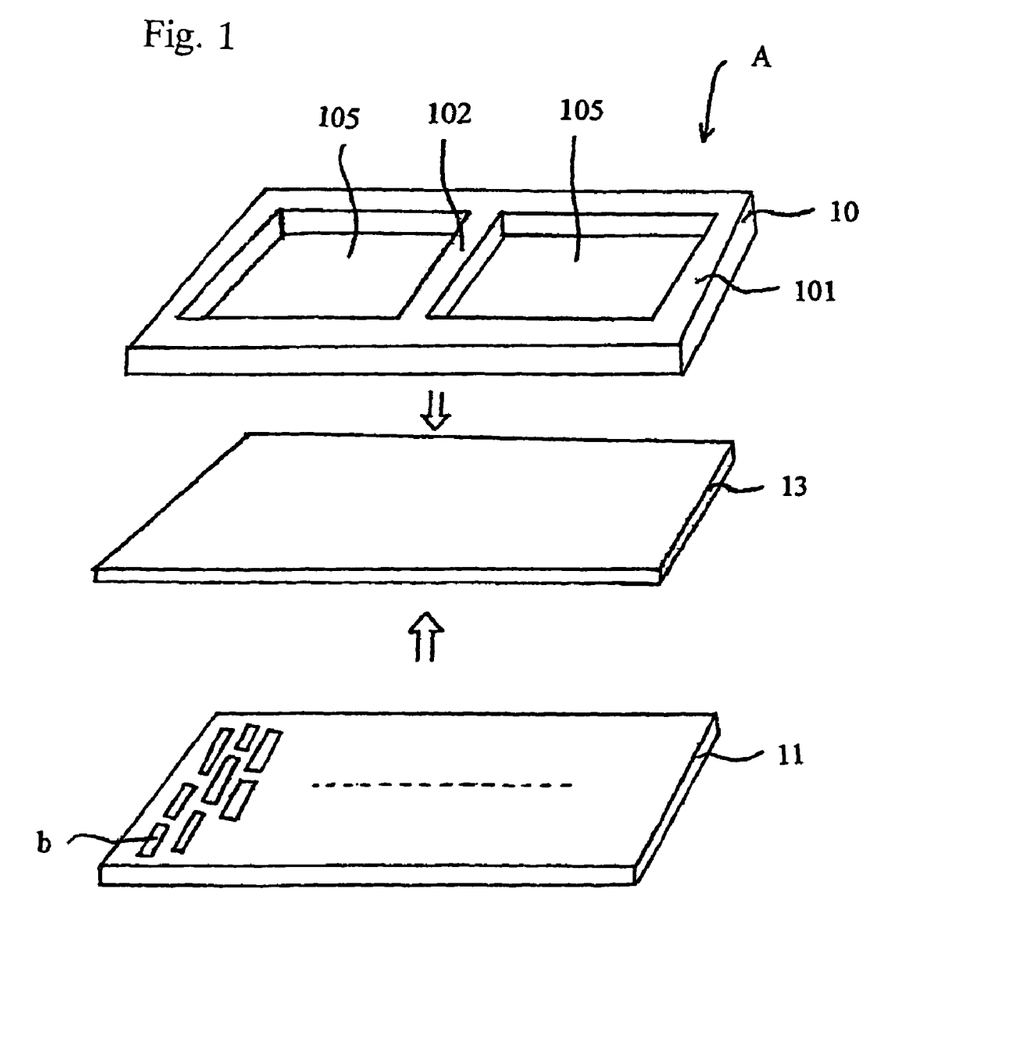
FIG. 1 is an exploded perspective view for explaining a structure of a gas separating unit.

FIG. 1 is a perspective view in which in order to explain a structure of a hydrogen gas separating unit A, it is exploded in three layers of first, second and third layers.

In FIG. 1, in the hydrogen gas separating unit A, on one surface of a material 13 capable of separating a hydrogen gas (for instance, a palladium alloy foil; in the following explanation, the palladium alloy foil will be taken as an example)

an extending frame 10 is laminated, and on the other surface thereof, a metal support 11 provided with a lot of holes is laminated.

As shown in FIG. 1, the extending frame 10 that is laminated on a top surface of the hydrogen gas separating unit A is a frame body having in a center portion thereof two openings 105 formed by etching and so on. As a shape of the openings 105, various shapes such as square, hexagon, circle, ellipse and so on can be applied. A way of arrangement thereof is neither restricted to a particular one. The extending frame 10, when opened as large as possible, is preferable because a gas permeation area can be made larger. It may be preferably formed in a structure with, for instance, a periphery portion 101 alone.

Furthermore, in taking the damage during handling of the palladium alloy foil 13 into consideration, as shown in FIG. 1, a center portion 102 maybe preferably formed. As a material of the extending frame 10, stainless steel, nickel or nickel base alloy, copper or copper alloy, iron alloy and so on can be preferably cited. A thickness of the extending frame 10 is preferably in the range of 10 to 500 µm and more preferably in the range of substantially 50 to 200 µm. When the thickness thereof is less than 10 µm, the mechanical strength is deficient as the frame body; on the other hand, when the thickness exceeds 500 µm, it unfavorably takes a long time to form by means of, for instance, etching and so on.

In the next place, the metal support 11 that is laminated on the other surface of the palladium alloy foil 13 will be explained.

In the metal support 11, circular or elliptic fine holes b having a diameter in the range of 10 to 500 µm, and preferably in the range of 50 to 200 µm are formed. When the diameter is less than 10 µm, the ventilation resistance of gas is large; on the other hand, when it exceeds 500 µm, the palladium alloy foil 13 bites in the fine holes b and cracks tend to be caused in the palladium alloy foil 13. A formation density of the fine holes b is preferably in the range of substantially 150 to 3000 holes/cm$^2$.

Furthermore, a shape of the fine holes b, as shown in FIG. 1, may be a long hole shape in which one diameter is very long. A state of arrangement of the fine holes b, though may be arranged in any way, when arranged in a staggered way, is preferable because a hole formation density can be heightened.

The metal support 11 is preferably a metal plate such as a stainless steel plate, nickel or nickel alloy plate, copper or copper alloy plate, iron alloy plate and so on. For the metal support 11, as a material, porous inorganic materials such as ceramics and so on also can be used.

A thickness of the metal support 11 is preferably in the range of 10 to 500 µm and more preferably in the range of substantially 50 to 200 µm. When the thickness is less than 10 µm, the mechanical strength as the support is deficient; on the other hand, when the thickness exceeds 500 µm, it unfavorably takes a long time to form fine holes by means of, for instance, etching and so on.

Subsequently, the palladium alloy foil 13 will be explained. The palladium alloy foil 13 is a thin foil of an alloy mainly made of palladium, one in which, alloyed to palladium, at least one kind of other metal selected from elements (for instance, cobalt and nickel), IB group elements (for instance, copper, silver and gold) and IIIB group elements (for instance yttrium) in the periodic table is preferably used. Among these, an alloy foil of palladium and silver, and an alloy foil of palladium, silver and holmium are more preferable.

A content of an element that is alloyed with palladium is preferably in the range of 1 to 50% by weight and more preferably in the range of 10 to 30% by weight. The reason to use the palladium alloy is because simple palladium causes hydrogen embrittlement and, when a content of an alloying metal is made 1% by weight or more, the hydrogen embrittlement can be inhibited from occurring.

Furthermore, when the content of the alloying metal exceeds 50% by weight, the permeation speed of hydrogen is unfavorably retarded.

A thickness of the palladium alloy foil 13, in view of the handlability thereof and so on, is preferably in the range of 3 to 100 µm and more preferably in the range of 5 to 50 µm. When the thickness of the palladium alloy foil 13 is less than 3 µm, pinholes are likely to be formed in the palladium alloy foil 13, resulting in deteriorating the purity of separated hydrogen. On the other hand, when the thickness exceeds 100 µm, the permeation speed of hydrogen becomes slow.

As materials capable of separating a hydrogen gas, the palladium alloy foil was explained as an example; however, other materials also can be used as far as these can separate a hydrogen gas or other gas. A form thereof may be various such as plate-like, foil-like and so on. Here, "being capable of separating a gas" means a function capable of selectively separating a particular gas from a mixed gas containing the particular gas. The particular gas may be a hydrogen gas.

In the next place, a manufacturing method of a gas separating unit according to the invention will be explained.

Figure 2:
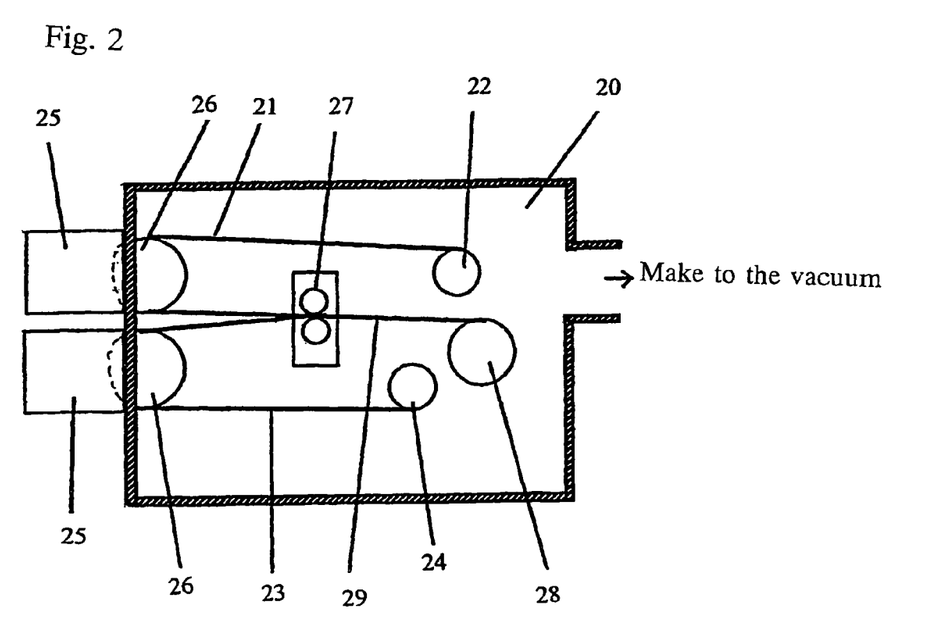
FIG. 2 is a schematic diagram of a clad plate-processing device that partially shows manufacturing steps of a gas separating unit.

FIG. 2 is a schematic diagram of a clad plate processing device which shows part of manufacturing steps of a gas separating unit. Firstly, on one surface of a metal plate 21 that becomes an extending frame, a palladium alloy foil 23 is laminated according to the cladding process. In applying the cladding process, the metal plate 21 that is surface cleaned in advance is wound around an unwinding reel 22 of the clad plate processing device shown in FIG. 2.

A thickness of the metal plate 21, counting on a decrease in the thickness at the following reel, is preferably in the range of 20 to 100 µm.

Similarly, a palladium alloy foil 23 that is surface cleaned in advance is wound around an unwinding reel 24.

As the palladium foil, one that has a thickness in the range of 6 to 100 µm that is thicker than the aforementioned finish thickness can be used. The use of a thicker one allows easily performing the handling at the cladding.

The metal plate 21 and the palladium alloy foil 23 are simultaneously unwound from the unwinding reels 22 and 24 and wound around electrode rolls 26 and 26 protruded into an etching chamber 25, and in the etching chamber 25 the respective laminate surfaces are sputter etched to activate.

A method of applying the sputter etching to activate, as previously disclosed by the present inventors in JP-A-01-224184, is preferably performed (1) in a very low pressure inert gas atmosphere in the range of $1 \times 10^{-1}$ to $1 \times 10^{-4}$ Torr, (2) by performing glow discharge by applying an alternate current in the range of 1 to 50 MHz between one electrode in which each of the metal plate 21 and the palladium alloy foil 23 is grounded and insulatively supported other electrode, (3) and with an electrode area exposed in a plasma generated by the glow discharge at one third or less of an electrode area, (4) by applying the sputter etching. Thereafter, by use of a rolling unit 27 disposed in a vacuum tank 20, a cladding process (cold welding with pressure) is applied, a clad plate 29 having a two-layered structure is wound with a winding roll 28, and thereby a clad plate 29 having the two layered laminated structure is manufactured. The clad plate 29 may be rolled in a rolling step as shown below.

Rolling Step (Reroll)

The clad plate 29 is again rolled to reduce both thicknesses of the metal plate 21 and the palladium alloy foil 23 to make thinner. A rolling reduction is preferably in the range of 20 to 70%. When it is less than 20%, thinning of the palladium alloy foil 23 is not caused in the rolling process; on the other hand, when it exceeds 70%, since a wavy undulation is formed at a bonded interface of the clad plate at the rolling, a thickness of the foil becomes uneven, resulting in deteriorating in the strength as a whole film. For instance, when one in which a silver/palladium alloy foil having an initial thickness of 20 µm and a stainless plate having an initial thickness of 200 µm are laminated according to the cladding process is rolled at the rolling reduction of 50%, one in which the respective thicknesses are reduced by 50% is obtained.

The rolling process may be performed in vacuum; however, one that was laminated, even when rolled in air, does not at all deteriorate in the bonding strength.

Figure 3:
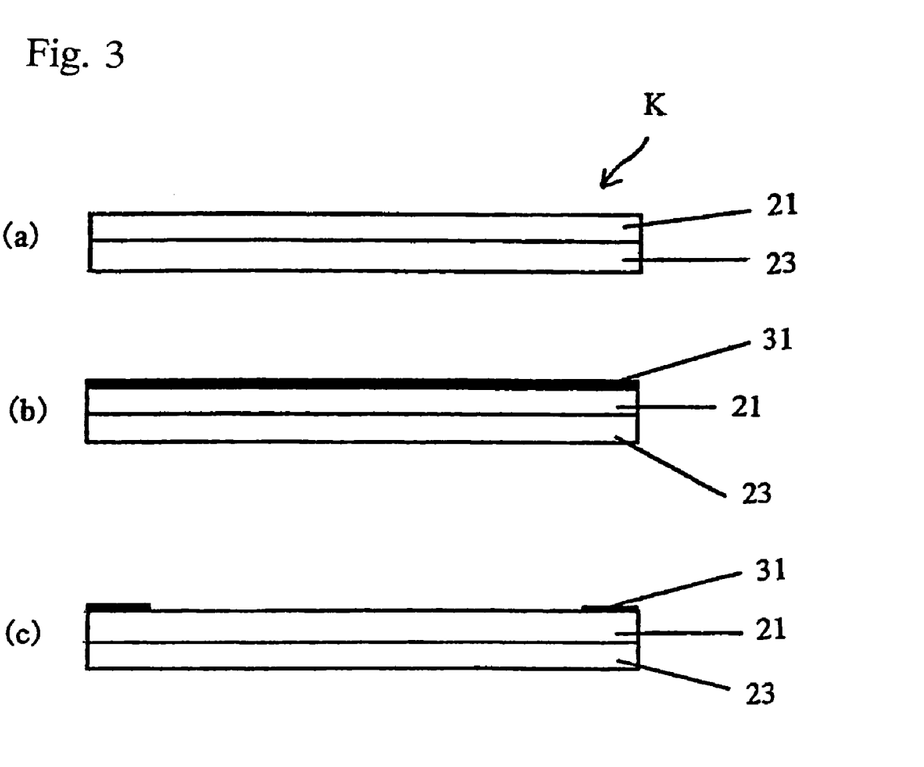

Thus-manufactured clad plate 29 is cut in appropriate sizes of length and width to form a cut clad plate K (FIG. 3($a$)), and the cut clad plate K is supplied as an original plate of a hydrogen gas separating unit.

In the next place, on one surface of the cut clad plate K obtained in the previous step, an opening 105 is formed by means of etching. As a method of applying etching, firstly, on one surface (metal plate 21) of the cut clad plate K, a negative resist 31 is coated (FIG. 3($b$)), after baking, through a mask thereon a pattern corresponding to the opening 105 is formed, light such as ultraviolet light or the like is irradiated to expose. After the exposure, development is applied (refer to FIG. 3($c$)) followed by post-baking further followed by etching to remove remaining resist, and thereby an extending frame 10 is completed.

In order to improve the resist adherence on the metal plate 21, it is preferable to cleanse a resist coating surface by, as pretreatment, applying alkali washing to the cut clad plate K with an aqueous solution of sodium hydroxide followed by water washing, neutralizing and drying. As a type of the resist, a water-soluble type such as casein type, PVA type and so on and a solvent-soluble type such as acrylic polymer system are used. As the resist coating conditions, for instance, ones such as mentioned below are preferable.

Kind of resist; water-soluble PVA-dichromate system [FR-14 manufactured by Fuji Yakuhin Kogyo]

Thickness of coating; 7 µm.

As a method of coating a resist on a cleansed metal plate 21, roll coat method, spin coat method, dip drawing-up coat method and so on can be applied.

A thickness of coating, though varying depending on the viscosity of resist, pulling up speed and so on, from a viewpoint of resolution, is preferably in the range of 3 to 15 µm. Subsequently, on a coating of the resist 31 a film mask on which a pattern image is formed in advance is brought into intimate contact followed by irradiating UV light for substantially 60 to 70 sec.

In the subsequent development step, the resist in an unexposed portion is dissolved and removed to expose a surface of the metal plate 21, and the exposed portion is etched in a later step (FIG. 3($c$)). The development is carried out by spray coating water. The coating of resist 31 thereon a pattern that becomes the opening 105 is formed, prior to the etching, in order to improve the adherence of the coating, is preferably subjected to the post baking by use of hot air, far ultraviolet radiation and so on. Ordinarily, it is applied at a temperature in the range of 100 to 120 degree centigrade for 15 to 30 min.

The etching of the metal plate 21 is carried out in two steps.

Firstly, as a first step of the etching, an aqueous solution of 45 to 49° Be (Baume) of ferric chloride is preferably sprayed on a surface of a target. A liquid temperature of the aqueous solution of ferric chloride is preferably in the range of 45 to 65 degree centigrade. In the first etching, substantially 80 to 90% of an amount of total etching is performed. In the next place, the second step of the etching is carried out. In the second etching, in order to completely remove a remaining metal plate 21, electrolytic etching is applied. As an electrolytic etching solution, a phosphoric acid solution is preferably used; however, as far as a solution can etch the metal plate, a kind thereof is not particularly restricted. The etched metal plate 21 is water washed to remove the resist, and thereby a framed palladium alloy foil p that is part of the hydrogen gas separating unit A and in which the extending frame 10 and the palladium alloy foil 13 are integrated is obtained.

In the etching according to the present embodiment, an etching solution was sprayed from one surface side so that an area of the opening 105 of the metal plate might be 70 mm×140 mm. The removal of the resist was carried out by immersing in an aqueous solution of 5 to 10% by weight of sodium hydroxide heated to a temperature in the range of 50 to 70 degree centigrade. In the embodiment, as a method of manufacturing a laminated body in which the metal plate 21 and the palladium alloy foil 23 are integrated, the cladding method is used to explain; however, by means of other method, both can be laminated. For instance, by use of an adhesive, a laminated body in which a metal plate 21 and a palladium alloy foil 23 are integrated can be also manufactured.

Furthermore, a frame body may be formed by previously punching a center part of a metal plate by means of a press process or the like, and the frame body can be integrated with a palladium alloy foil by use of the welding process.

Figure 5:
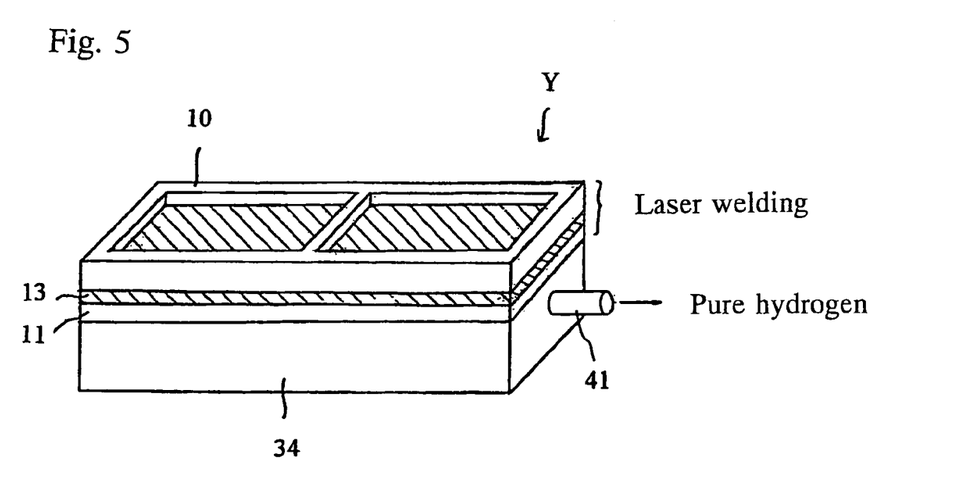
FIG. 5 is schematic perspective view of a hydrogen gas separator Y.

Subsequently, on a lower side of the palladium alloy foil p that is manufactured in the previous step and has a frame, a metal support plate 11 such as shown in FIG. 1 is applied, and thereby a hydrogen gas separating unit A according to the invention is brought to completion. Thus completed hydrogen gas separating unit A is fixed at the periphery thereof to a case 34 by means of laser welding and so on with a surface of the metal support plate 11 located inside thereof, and thereby a hydrogen gas separator Y is obtained (FIG. 5).

Figure 4:
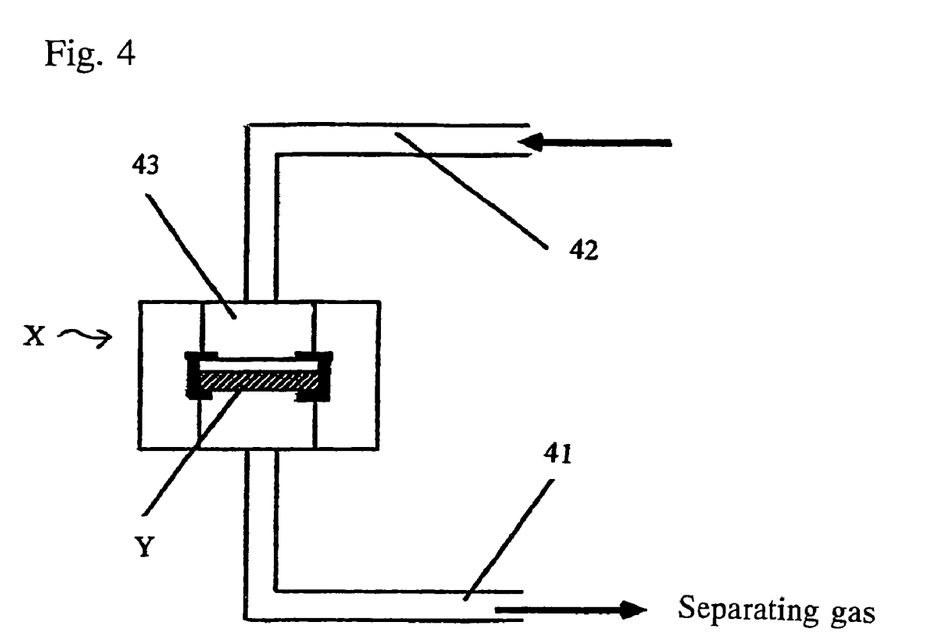
FIG. 4 is an explanatory diagram showing an example of a method of separating hydrogen by use of a hydrogen gas separating unit.

In the next place, an example of a method of separating hydrogen by use of the hydrogen gas separating unit A according to the invention will be explained with reference to FIG. 4. As shown in FIG. 4, as a hydrogen gas separating machine X, a hydrogen gas separating machine X in which the hydrogen gas separating unit A according to the invention is assembled is disposed.

When a raw material gas is introduced from a raw material gas introducing pipe 42 at an upper portion of the hydrogen gas separating machine X, hydrogen gas in the raw material has goes through the palladium alloy foil 13 of the hydrogen gas separating unit 105 and is taken out of a separated gas exhaust pipe 41 disposed at a lower portion as a permeated gas. On the other hand, a non-permeated gas is exhausted outside from an upper portion 43 of the hydrogen gas separating machine X.

INDUSTRIAL APPLICABILITY

A gas separating unit according to the present invention is large in an exposed area of a material capable of separating a hydrogen gas (palladium alloy foil) and a palladium alloy foil is in a state extended with an extending frame; accordingly, a gas separating unit can be manufactured without destroying the palladium alloy foil. Furthermore, on a bottom side of the palladium alloy foil, a metal support plate is applied; accordingly, the palladium alloy foil is not destroyed owing to a pressure of a raw material gas.

The invention claimed is:

1. A method of manufacturing a gas separating unit characterized by including
    manufacturing a clad plate by laminating a material capable of separating a hydrogen gas on one surface of a metal plate by cold welding after applying sputter etching;
    cutting the obtained clad plate to make a cut clad plate;
    etching the metal plate of the cut clad plate to expose the material capable of separating a hydrogen gas and forming an extension frame; and
    laminating on the other surface of the material a metal support body that supports the material.

2. The method of claim 1 wherein said material capable separating a hydrogen gas is a palladium foil or a palladium alloy foil.

3. A method of manufacturing a gas separating unit characterized in including
    laminating a material capable of separating a gas on one surface of a metal plate to form a laminated plate;
    thinning the obtained laminated plate by cold rolling to provide a reduction of 20% to 70%; and
    etching the metal plate of the laminated plate to expose the material capable of separating a gas and forming an extension frame.

4. The method of claim 3 wherein said material capable separating a hydrogen gas is a palladium foil or a palladium alloy foil.

5. A method of manufacturing a gas separating unit, comprising
    providing a palladium alloy foil (13) consisting essentially of palladium and 10–30% by weight of an alloying metal selected from the group consisting of cobalt, nickel, copper, silver, gold, holmium and mixtures thereof;
    providing a metal sheet (21) for lamination to said palladium alloy foil (13);
    subjecting at least one surface of said palladium alloy foil (13) and at least one surface of said metal sheet (21) to sputter etching to provide sputter etched surfaces;
    bringing sputter etched surfaces of said metal sheet (21) and said palladium alloy foil (13) together and cold welding together said palladium alloy foil (13) and said metal sheet (21) with pressure to provide a clad plate (K) laminated structure;
    subjecting said metal plate (21), having a thickness of 10–500 µm, of said clad plate (K) laminate structure to etching so as to provide a frame (10) comprising a peripheral portion (101), said frame (10) being substantially open in area surrounded by said peripheral portion (101);
    providing a support plate (11) of metal or ceramic and having a thickness of 10–500 µm, said support plate (11) having a plurality of fine openings B extending therethrough, said fine openings each having a size of 10–500 µm, the number of said fine openings per square centimeter being substantially 150–3,000; and
    laminating said support plate (11) to a surface of said palladium alloy foil (13) opposite from said frame (10), said palladium alloy foil (13) having a thickness of 5–50 µm.

6. The method of claim 5, wherein said support plate has a thickness of 50–200 µm.

7. The method of claim 5, wherein said frame (10) has a thickness of 50–200 µm.

8. The method of claim 5, wherein said palladium alloy foil (13) has a thickness of 5–50 µm.

9. The method of claim 5, wherein, following of said cold welding with pressure of said palladium alloy foil (13) to said metal sheet (21), the resultant laminate is re-rolled to provide a rolling reduction in the range of 20–70%.

* * * * *